United States Patent
El-Refaey et al.

(10) Patent No.: US 9,326,156 B2
(45) Date of Patent: Apr. 26, 2016

(54) SPECTRUM RECLAIMING IN A LEASED SPECTRUM SYSTEM

(71) Applicant: Intel Corporation, Santa Clara, CA (US)

(72) Inventors: Mohamed El-Refaey, Cairo (EG); Markus Dominik Mueck, Neubiberg (DE); Kirk D. Smith, Chandler, AZ (US); Hazem Abdelmegeed, Maadi (EG); Hani H. Elgebaly, Cairo (EG); Norhan M. Osman, Giza (EG)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 14/361,745

(22) PCT Filed: Dec. 26, 2013

(86) PCT No.: PCT/US2013/077747
§ 371 (c)(1),
(2) Date: May 30, 2014

(87) PCT Pub. No.: WO2015/099720
PCT Pub. Date: Jul. 2, 2015

(65) Prior Publication Data
US 2015/0304852 A1   Oct. 22, 2015

(51) Int. Cl.
H04W 72/00 (2009.01)
H04W 16/14 (2009.01)
H04W 28/16 (2009.01)
H04W 72/08 (2009.01)

(52) U.S. Cl.
CPC .............. *H04W 16/14* (2013.01); *H04W 28/16* (2013.01); *H04W 72/085* (2013.01)

(58) Field of Classification Search
CPC ..... H04W 16/14; H04W 28/16; H04W 72/04; H04W 72/0426; H04W 72/08
USPC ......................................... 455/454, 63.1, 450
See application file for complete search history.

(56) References Cited

U.S. PATENT DOCUMENTS

| 2008/0108365 A1 | 5/2008 | Buddhikot et al. |
| 2009/0059856 A1 | 3/2009 | Kermoal et al. |
| 2011/0250915 A1 | 10/2011 | Stanforth et al. |

(Continued)

OTHER PUBLICATIONS

International Search Report and Written Opinion from related application PCT/US2013/077747 mailed Sep. 25, 2014.

*Primary Examiner* — Tu X Nguyen
(74) *Attorney, Agent, or Firm* — Grossman, Tucker, Perreault & Pfleger, PLLC

(57) ABSTRACT

This disclosure is directed to spectrum reclaiming in a leased spectrum system. A spectrum exchange coordinator (SEC) may be interposed between a spectrum owner and at least one operator to facilitate the leasing and reclaiming of spectrum. Upon occurrence of a trigger, the SEC may then determine a procedure for allowing the spectrum owner to reclaim the leased spectrum. The spectrum owner may be allowed to reclaim the leased spectrum in full based on an agreement. If not previously agreed to, the spectrum owner may be allowed to reclaim at least part of the spectrum. These operations may include a dual risk evaluation to determine how reclaiming the leased spectrum will affect quality of service (QoS). Partial or gradual reclaiming may then allow the leased spectrum to be reclaimed while minimizing impact. Examples of gradual reclaiming may be based on a time domain, frequency domain, or cellular basis.

24 Claims, 8 Drawing Sheets

(56) References Cited

U.S. PATENT DOCUMENTS

| | | |
|---|---|---|
| 2012/0120887 A1 | 5/2012 | Deaton et al. |
| 2013/0295946 A1 | 11/2013 | Panchal et al. |
| 2014/0086194 A1 * | 3/2014 | Sugahara .............. H04W 28/16 370/329 |
| 2014/0162617 A1 | 6/2014 | Mueck et al. |
| 2014/0162667 A1 | 6/2014 | Mueck |
| 2014/0171018 A1 | 6/2014 | ElRefaey et al. |
| 2014/0171136 A1 | 6/2014 | ElRefaey et al. |
| 2014/0192685 A1 | 7/2014 | Mueck et al. |
| 2014/0321425 A1 | 10/2014 | Mueck et al. |
| 2015/0005022 A1 | 1/2015 | ElRefaey et al. |

* cited by examiner

FIG. 6

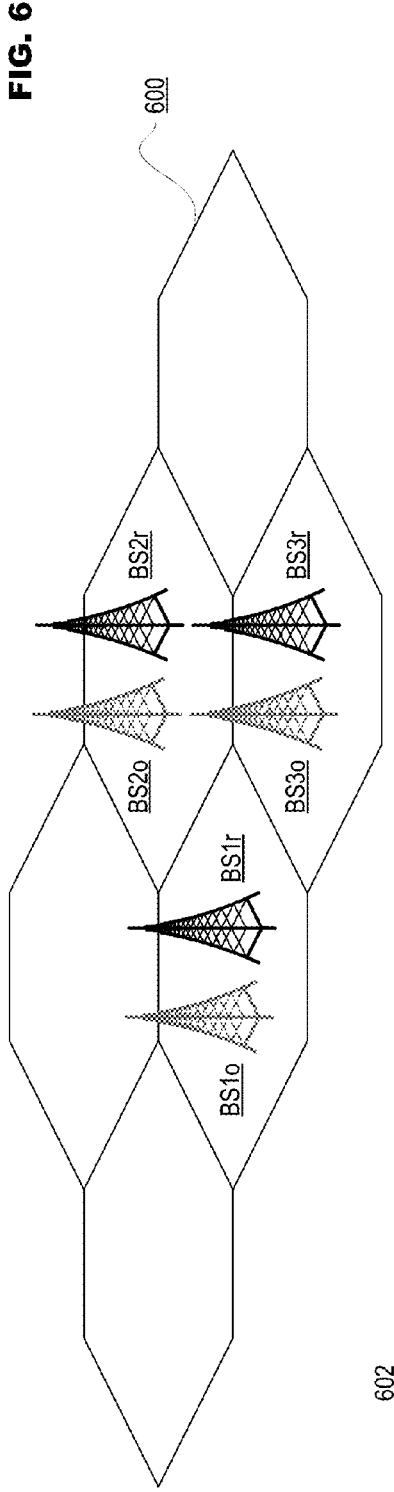

602

| Operator(r)/Owner(o) | BS1o | BS2o | BS3o |
|---|---|---|---|
| BS1r | SINR(db) 1r1o | SINR(db) 1r2o | SINR(db) 1r3o |
| BS2r | SINR(db) 2r1o | SINR(db) 2r2o | SINR(db) 2r3o |
| BS3r | SINR(db) 3r1o | SINR(db) 3r2o | SINR(db) 3r3o |

604

| Operator(r)/Owner(o) | BS1o | BS2o | BS3o |
|---|---|---|---|
| BS1r | ΔSINR(db) 1r1o | ΔSINR(db) 1r2o | ΔSINR(db) 1r3o |
| BS2r | ΔSINR(db) 2r1o | ΔSINR(db) 2r2o | ΔSINR(db) 2r3o |
| BS3r | ΔSINR(db) 3r1o | ΔSINR(db) 3r2o | ΔSINR(db) 3r3o |

606

| Dependent Independent Variable | Manipulatd "Pull-Back" Variable (MV) | | | Pull-Back Disturbance Variable | |
|---|---|---|---|---|---|
| Owner(o)/Operator(r) | BS1r | BS2r | BS3r | PB1d | PB2d |
| Bs1o | $K_{s1o1r}$ | $K_{s1o2r}$ | $K_{s1o3r}$ | | |
| BS2o | $K_{s2o1r}$ | $K_{s3o2r}$ | $K_{s2o3r}$ | | |
| BS3o | $K_{s3o1r}$ | $K_{s3o2r}$ | $K_{s3o3r}$ | | |
| PB1o | $-K_{s1rpb1}$ | $-K_{s2rpb1}$ | $-K_{s3rpb1}$ | $K_{pb1dpb1}$ | |
| PB2o | $-K_{s1rpb2}$ | $-K_{s2rpb2}$ | $-K_{s3rpb2}$ | | $K_{pb2dpb2}$ |

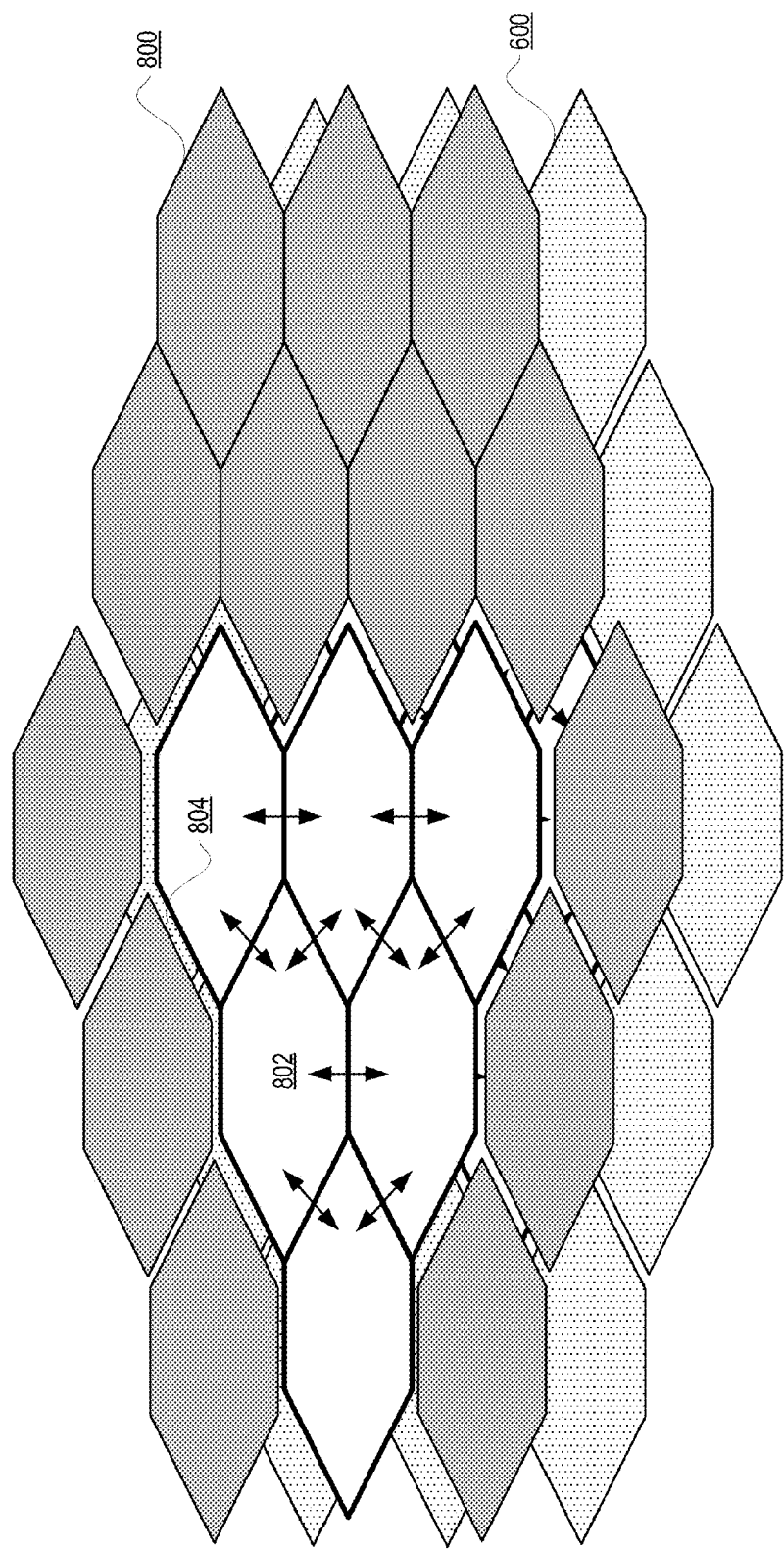

SPECTRUM RECLAIMING IN A LEASED SPECTRUM SYSTEM

TECHNICAL FIELD

The present disclosure relates to wireless communication, and more particularly, to a system for allowing a spectrum owner to reclaim leased spectrum from at least one operator.

BACKGROUND

As wireless technology continues to evolve, the number of wireless-enabled devices in the marketplace continues to expand. Not only are devices emerging that are primarily tasked with wireless communication (e.g., cellular handsets, smartphones, etc.), but also applications that did not previously include any form of communication functionality are becoming able to interact wirelessly. For example, vehicles, appliances, heating, ventilation and air conditioning (HVAC) systems, thermostats, manufacturing equipment, security systems, street signs etc. may all be configured to interact wirelessly, with other wireless applications being devised daily.

While the benefits of communication functionality associated with wireless devices may be apparent, an unintended consequence of this wireless explosion is the large amount of traffic that has been created. Wireless communication bandwidth may generally be divided into two categories: regulated spectrum and unregulated spectrum. Regulated spectrum may be reserved for government services (e.g., police, fire, etc.) or licensed to a wireless service provider for use exclusively by their subscribers. Unregulated spectrum may be used by anyone and is typically limited to short-range wireless communication mediums (e.g., Bluetooth, wireless local area networking (WLAN), etc.) in relatively "noisy" bandwidths. It might seem logical that designers would want to use unregulated spectrum whenever possible due to availability, cost savings, etc. While unregulated spectrum may be attractive for some uses, the limitations on its use (e.g., only for short-range wireless communication), interference caused by other signal sources operating in the same spectrum, etc. do not allow it to be a direct replacement for regulated spectrum.

On the other hand, the amount of regulated spectrum is very limited. Emerging systems that seek to maximize utilization for regulated spectrum by sharing access amongst a plurality of users face many challenges. For example, some systems may allow an owner of spectrum (e.g., a governmental entity) to lease their bandwidth to another party (e.g., a mobile operator) based on a limited agreement. However, there may be instances where there is an immediate need on the part of the owner to reclaim the leased bandwidth, such as the occurrence of an emergency or another change in the status of the owner of the spectrum.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 6 illustrates example interference criteria for dual risk evaluation in accordance with at least one embodiment of the present disclosure;

FIG. 8 illustrates an example of the effects of spectrum reclaiming on adjacent cells in a multilayer cellular system in accordance with at least one embodiment of the present disclosure.

Figure 1:
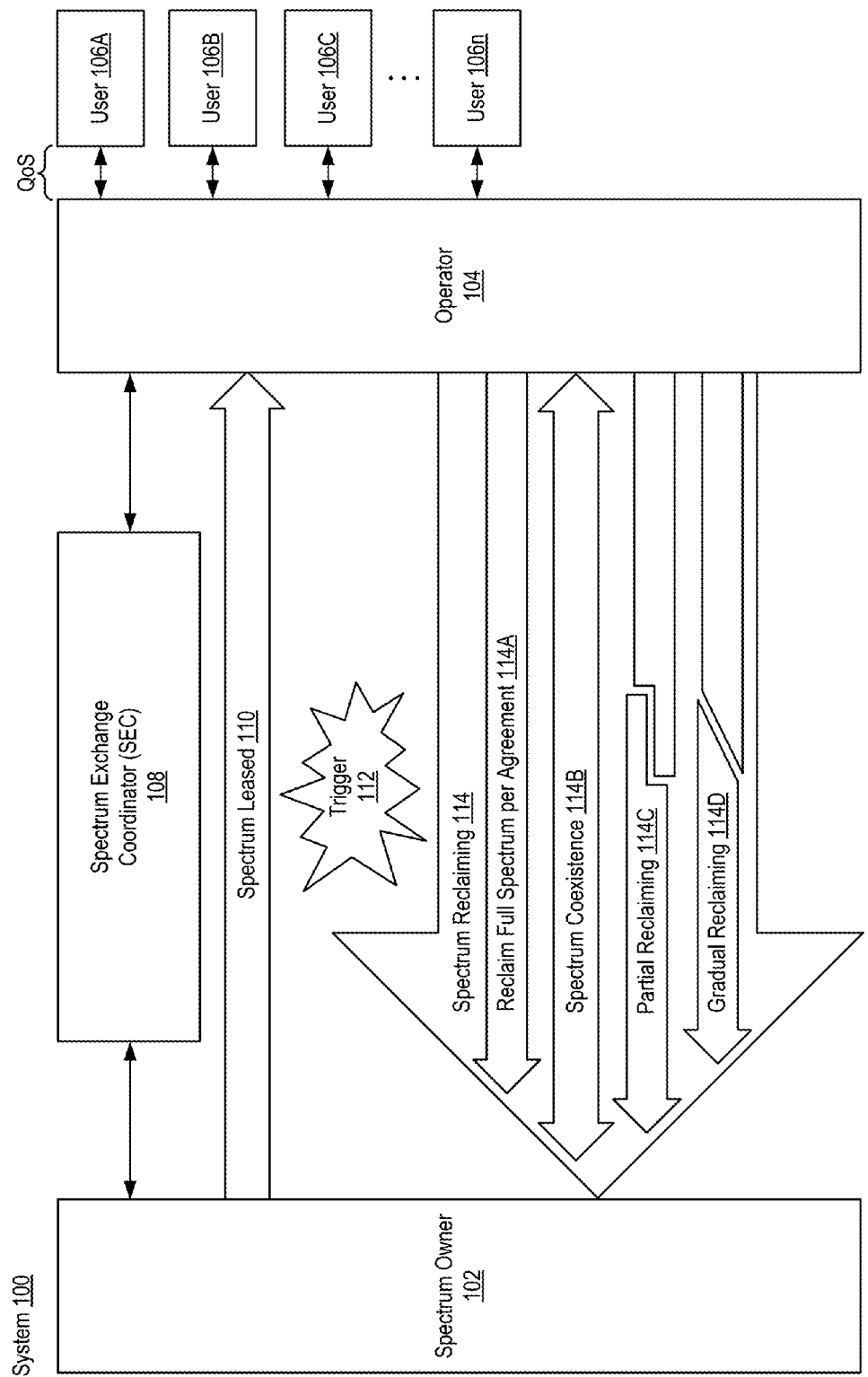
FIG. 1 illustrates an example of spectrum reclaiming in a leased spectrum system accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to spectrum reclaiming in a leased spectrum system. In general, the use of licensed spectrum may be maximized through a system that may facilitate spectrum owners (e.g., a governmental entity) leasing unused portions of spectrum to at least one operator (e.g., cellular provider). However, there may be certain events (e.g., a national emergency) wherein the spectrum owner needs to reclaim the leased spectrum. A spectrum exchange coordinator (SEC) may be interposed between the spectrum owner and at least one operator to facilitate the leasing and reclaiming of spectrum. In one embodiment, upon the occurrence of a trigger (e.g., a spectrum owner requesting to reclaim leased spectrum), the SEC may then determine a procedure for allowing the spectrum owner to reclaim the leased spectrum. For example, the spectrum owner may be allowed to reclaim at least a portion of the leased spectrum based on an agreement between the spectrum owner and at least one operator. If not previously agreed to, a variety of operations may be employed to allow the spectrum owner to reclaim the leased spectrum. These operations may include a dual risk evaluation that may determine how reclaiming the leased spectrum will affect quality of service (QoS) for both the spectrum owner and the at least one operator. Based on the dual risk evaluation, a partial or gradual reclaiming operation may allow the leased spectrum to be reclaimed with as little impact to the spectrum owner and at least one operator as possible. Examples of gradual reclaiming may be based on a time domain, frequency domain, or on a regional (e.g., cellular) basis.

In one embodiment there is at least one device for managing the reclaiming of leased spectrum. The at least one device may comprise, for example, at least a communication module and a spectrum leasing and reclaiming (SLR) module. The communication module may be to communicate with at least one of a spectrum owner and at least one operator. The SLR module may be to determine operations for allowing the spectrum owner to reclaim at least part of a leased spectrum from the at least one operator and allow the spectrum owner to reclaim the at least part of the leased spectrum from the at least one operator based on the operations.

In one embodiment, the operations may comprise the spectrum leasing and reclaiming module being further to allow the spectrum owner to reclaim at least part of the leased spectrum upon request or after a delay after the request is received based on an agreement between the spectrum owner and the at least one operator. The operations may also comprise the spectrum leasing and reclaiming module being further to determine whether the spectrum owner and the at least one operator can operate concurrently within the leased spectrum based on a quality of service measurement obtained from at least one of the spectrum owner or the at least one operator. The operations may also comprise the spectrum leasing and reclaiming module being further to, upon determining that the spectrum owner and the at least one operator cannot operate concurrently within the leased spectrum, cause the spectrum owner and the at least one operator to perform a dual risk evaluation. The dual risk evaluation may comprise the spectrum leasing and reclaiming module being further to cause at least one of the spectrum owner and the at least one operator to measure interference at corresponding base station pairs in a frequency band or a group of frequency bands, and to determine a signal-to-interference noise ratio for each base station pair based on the interference. The operations may also comprise the spectrum leasing and reclaiming module being further to rank the impact on quality of service of allowing spectrum to be reclaimed for each base station pair, the impact on the quality of service being based at least on the signal-to-interference noise ratio. The ranking may be determined using at least one of a linear program or quadratic program to maximize the quality of service based on at least one of a current load for each base station pair or a projected load for each base station pair.

In the same or a different embodiment, the operations comprise the spectrum leasing and reclaiming module being further to allow the spectrum owner to reclaim the spectrum gradually based on the dual risk evaluation. Reclaiming the spectrum gradually may comprise returning full use of the leased spectrum to the spectrum owner over increasing durations in a series of time periods or over increasing frequencies in the series of time periods. Reclaiming the spectrum gradually may also comprise returning full use of the leased spectrum to the spectrum owner on a regional basis based at least on the ranking. A method for allowing leased spectrum to be reclaimed consistent with the present disclosure may comprise determining if a spectrum owner and at least one operator leasing spectrum from the spectrum owner can operate concurrently within the leased spectrum, and if it is determined that the spectrum owner and at least one operator cannot operate concurrently within the leased spectrum, determining how to allow the spectrum owner to reclaim at least part of the leased spectrum while minimizing a negative impact on quality of service for the at least one operator.

FIG. 1 illustrates an example of spectrum reclaiming in a leased spectrum system accordance with at least one embodiment of the present disclosure. In general, system 100 may be configured to facilitate the brokering of spectrum. Spectrum, as referenced herein, may refer to certain wireless frequencies or channels in which at least one licensed entity is allowed to operate. Wireless service providers may license spectrum from a governmental entity so that their users may have exclusive right to operate within the licensed frequencies. However, worldwide demand for wireless service is quickly exhausting the available licensed bandwidth. Modes of operation are needed that allow licensed spectrum to be leveraged in a more efficient manner. Consistent with the present disclosure, system 100 may provide a manner in which the usage of licensed bandwidth may be increased through shared access.

System 100 may comprise, for example, spectrum owner 102, at least one operator 104 and SEC 108. Examples of spectrum owner 102 may include, but are not limited to, a governmental entity, a regulatory body or a private organization that is licensed to exclusive use of certain spectrum. Operator 104 may be a public or private entity that seeks to utilize the licensed spectrum at least on a temporary basis such as a wireless service provider that seeks bandwidth to accommodate wireless operation for user 106A, user 106B, user 106C to user 106n (collectively "users 106A . . . n). In one embodiment, operator 104 may interact with users 106A . . . n through a cellular network complying with, or otherwise compatible with, the Third Generation Partnership Project (3GPP) Long Term Evolution (LTE) and/or LTE-Advanced (LTE-A) based wireless network standard, including current, previous and future versions of that standard. While more than one operator 104 may lease the spectrum owned by spectrum owner 102, for the sake of clarity the examples disclosed herein will discuss interactions between a single spectrum owner 102 and a single operator 104. Functionality associated with SEC 108 may be added into the overall network architecture of system 100, or alternatively, may be incorporated into components already existing in system 100. These components may be associated with spectrum owner 102, operator 104 or it may be part of a system operated by a standalone service provider or similar third-party stakeholder. In one embodiment, SEC 108 may facilitate the leasing of spectrum owned by spectrum owner 102 to operator 104, as well as the reclaiming of the spectrum by spectrum owner 102 from operator 104. Example SEC 108 may comprise at least one device accessible via a network such as a local-area network (LAN), a wide-area network (WAN) like the Internet, a global-area network (GAN), etc. In one embodiment, SEC 108 may include at least one computing device (e.g., server) organized in a cloud-computing configuration accessible via the Internet.

In an example of operation, SEC 108 may facilitate the leasing of certain spectrum owned by spectrum owner 102 to operator 104 as shown at 110. The leasing of the spectrum may be controlled by an agreement that dictates the terms of the lease. Example terms in the agreement may include, but are not limited to, a cost for the leased spectrum, how and when the cost is payable, a duration of the lease, how the spectrum may be used and provisions for reclaiming the spectrum. Reclaiming provisions may be important in a variety of scenarios. For example, spectrum owner 102 may be a governmental agency and the leased spectrum may typically be reserved for emergency communications. Thus, spectrum owner 102 may require the ability to reclaim the spectrum given the occurrence of a national emergency. If spectrum owner 102 is private (e.g., another cellular service provider), the spectrum may be overhead reserved for substantial spikes in communications traffic (e.g., in the occurrence of a traffic "hot spot" during a major event, in the instance of an emergency, etc.). Moreover, an allowance for an adjustment in the terms of the agreement (e.g., due to anticipated fluctuation in the requirements of spectrum owner 102) may allow at least some of the leased spectrum to be reclaimed on an as-needed basis. Regardless of the rational, spectrum owner 102 may insist on defining the ability to reclaim spectrum prior to the end of the lease to operator 104 in the terms of the spectrum lease agreement.

Following leasing of the spectrum at 110, a trigger may occur at 112 that may cause spectrum owner 102 to request reclaiming of the leased spectrum. Trigger 112 may include, for example, a manually or automatically generated message requesting to reclaim the leased spectrum transmitted to SEC 108 and possibly to operator 104 from spectrum owner 102. SEC 108 may then determine a procedure (e.g., including one or more operations) to manage the return of the leased spectrum to spectrum owner 102. Examples of different types of spectrum reclaiming procedures are disclosed at 114. For example, the agreement established between spectrum owner 102 and operator 104 may dictate that following the occurrence of trigger 112 the full leased spectrum will be returned to spectrum owner 102. This procedure is shown at 114A wherein spectrum owner 102 may reclaim full spectrum per agreement. In some instances a delay or lead time may be arranged to allow operator 104 to exit the leased spectrum in an orderly manner (e.g., to maintain the QoS for users 106A . . . n). It may also be possible for spectrum owner 102 and operator 104 to coexist within the same leased spectrum as shown at 114B. For example, spectrum owner 102 may need to transmit small and/or infrequent messages that may not negatively influence the QoS experienced by users 106A . . . n. QoS may be defined based on the type of interaction being pursued by users 106A . . . n. In terms of a cellular network, QoS may include dropped calls, poor audio quality, intermittent data connections from user equipment (UE) to base stations (BS) that are part of a wireless data network maintained by operator 104, slow data connections, etc. If the traffic (e.g., wireless communication load) added by spectrum owner 102 does not negatively affect QoS, then spectrum owner 102 and operator 104 may use the leased spectrum concurrently.

If it is determined that coexistence between spectrum owner 102 and operator 104 in the leased spectrum is not possible, then the leased spectrum may be reclaimed by spectrum owner 102 utilizing a partial or gradual reclaiming procedure that may allow operator 104 to surrender the leased spectrum in a manner that minimizes, to the degree possible, impact on the QoS of users 106A . . . n. A partial reclaiming of leased spectrum as shown at 114C may comprise, for example, operator 104 immediately surrendering some frequencies or channels in the leased spectrum to spectrum owner 102. Partial reclaiming may allow operator 104 to temporarily preserve some users 106A . . . n within the retained portion of the leased spectrum while pushing other users 106A . . . n to other bands either owned or leased by operator 104. In practice, operator 104 may transmit a message to users 106A . . . n advising of the need to leave the leased spectrum. Users 106A . . . n that leave the leased spectrum may experience negative QoS issues. In one example implementation, operator 104 may organize users 106A . . . n into different classes (e.g., a preferred user class and a normal user class) and may then push users 106A . . . n out of the leased spectrum based on their classification. The gradual reclaiming of leased spectrum as shown at 114D may involve a variety of procedures that allow a gradual transfer of leased spectrum back to spectrum owner 102 (e.g., to reduce the negative impact on QoS for users 106A . . . n). More detailed examples of gradual reclaiming will be explained further with respect to FIG. 3.

Figure 2:
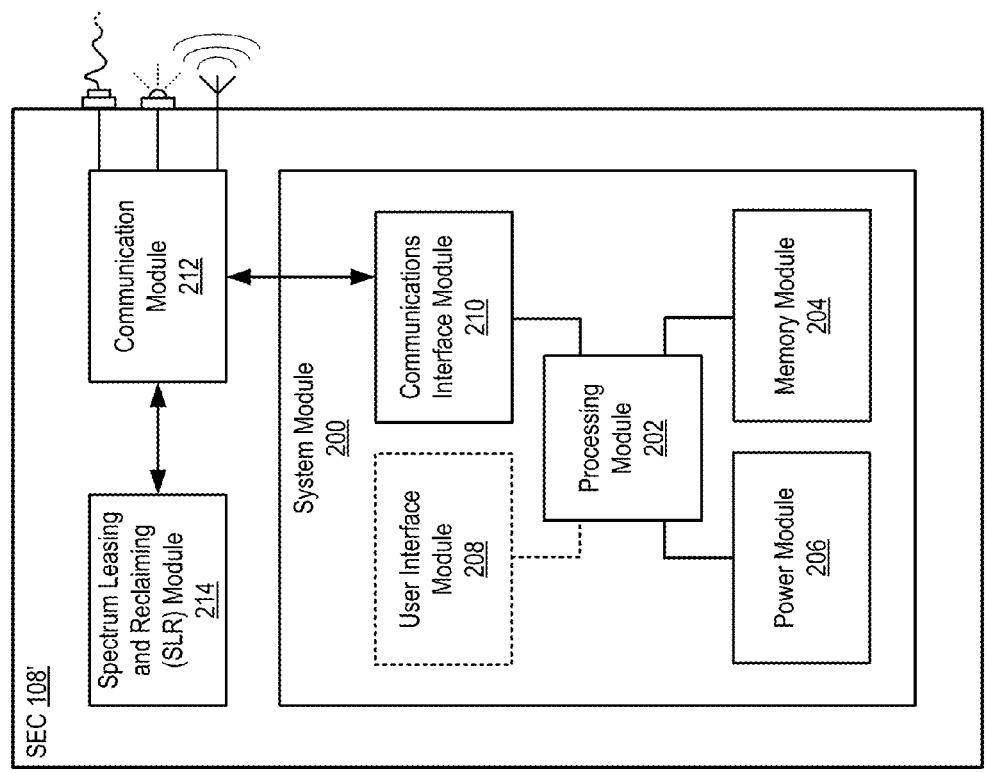
FIG. 2 illustrates an example configuration for a spectrum exchange coordinator usable in accordance with at least one embodiment of the present disclosure.

FIG. 2 illustrates an example configuration for an SEC usable in accordance with at least one embodiment of the present disclosure. In particular, while SEC 108' may perform example functionality such as shown in FIG. 1, it is meant only as an example of equipment that may be used in accordance with embodiments consistent with the present disclosure, and is not meant to limit these various embodiments to any particular manner of implementation. For example, a plurality of devices operating individually or collaboratively may be required based on the size of system 100 (e.g., the number of spectrum owners 102 and operators 104).

SEC 108' may comprise system module 200 configured to manage device operations. System module 200 may include, for example, processing module 202, memory module 204, power module 206, user interface module 208 and communication interface module 210. SEC 108' may further comprise at least communication module 212 configured to interact with at least communication module 210 and SLR module 214 configured to interact with at least communication module 212. While communication module 212 and SLR module 214 have been shown as separate from system module 200, this configuration is merely for the sake of explanation herein. Some or all of the functionality associated with communication module 212 and/or SLR module 214 may also be incorporated within system module 200.

In SEC 108', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in SEC 108'. Some or all of the functionality commonly associated with the support circuitry may also be included in the same physical package as the processor (e.g., an SoC package like the Sandy Bridge integrated circuit available from the Intel Corporation).

Processing module 202 may be configured to execute various instructions in SEC 108'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of SEC 108' such as, for example, static RAM (SRAM) or Dynamic RAM (DRAM). ROM may include nonvolatile memory loaded with boot code employing basic input/output instructions (BIOS), Unified Extensible Firmware Interface (UEFI), etc. to perform operations when SEC 108' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), a Digital Video Disc (DVD), a Blu-Ray disc, etc.

Power module 206 may include internal power sources (e.g., a battery, fuel cell, etc.) and/or external power sources (e.g., an electromechanical or solar generator, power grid, an external fuel cell, etc.), and related circuitry configured to supply SEC 108' with the power needed to operate. User interface module 208 may be optional in that some devices (e.g., a server) may not comprise user interface module 208, and may instead rely upon a separate device (e.g., a management terminal) to provide user interface functionality. User interface module 208 may include circuitry configured to allow users to interact with SEC 108' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.).

Communication interface module 210 may be configured to handle packet routing and other control functions for communication module 212, which may include resources configured to support wired and/or wireless communications. In some instances, SEC 108' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.), long range wireless mediums (e.g., cellular wide area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard), electronic interaction via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. Moreover, while the embodiment disclosed in FIG. 2 illustrates communication interface module 210 being separate from communication module 212, it may also be possible for the functionality of communication interface module 210 and communication module 212 to be incorporated within the same module.

In the embodiment illustrated in FIG. 2, SLR module 214 may interact with at least communication module 212. In an example of operation, SLR module 214 may utilize at least communication module 212 to interact with spectrum owner 102 and/or operator 104. SLR module 214 may receive lease agreements and/or requests to reclaim leased spectrum from spectrum owner 102 and/or operator 104 via communication module 212, and may also transmit instructions for allowing spectrum reclaiming to spectrum owner 102 and operator 104 via communication module 212. While not shown in FIG. 2, SLR module 214 may also interact with other modules within SEC 108' during spectrum leasing or reclaiming activities. For example, agreements may be stored in a database within memory module 204, processing tasks related to spectrum leasing/reclaiming may be handled by processing module 202, etc.

Figure 3:
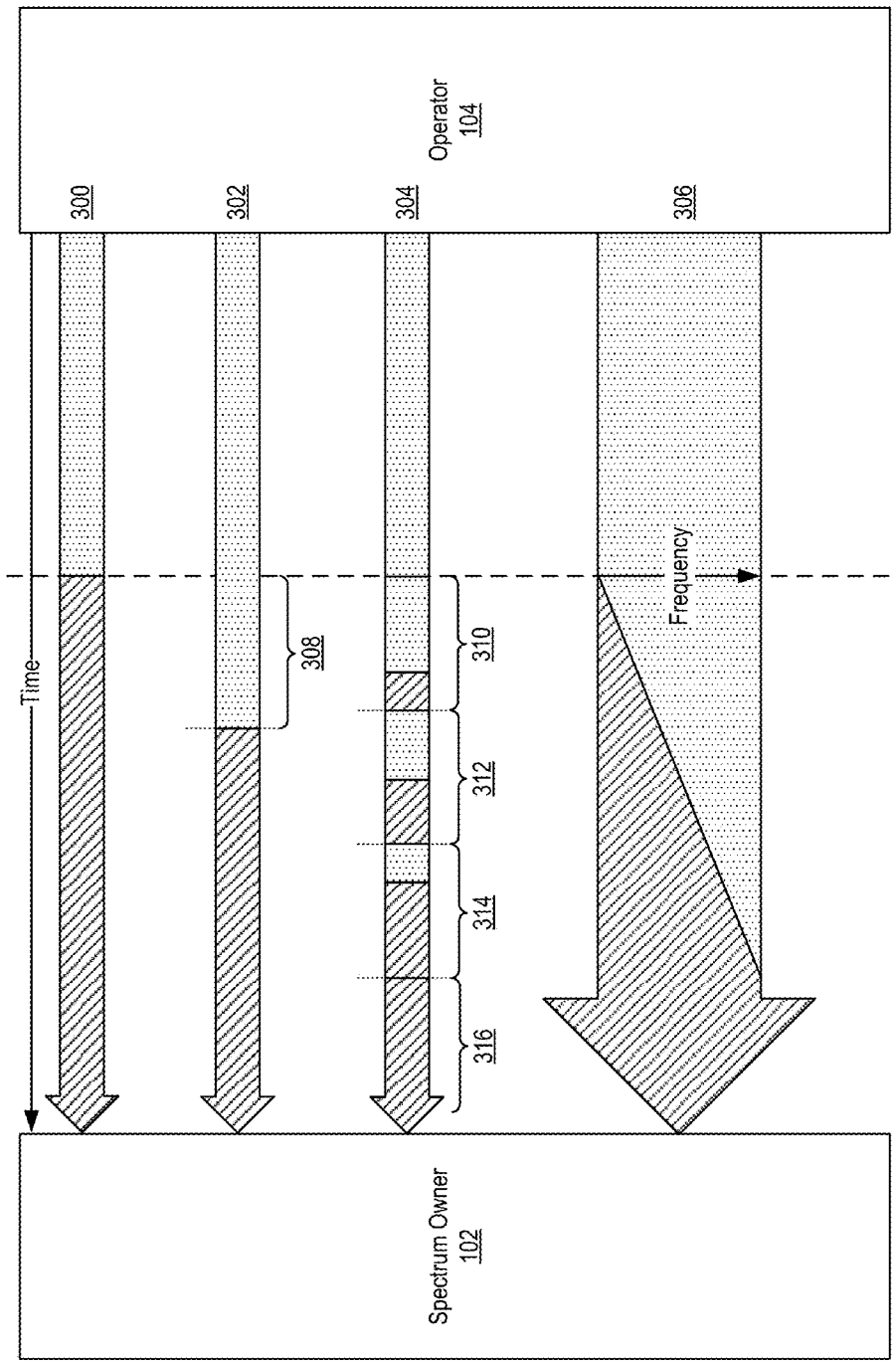
FIG. 3 illustrates examples of spectrum reclaiming in accordance with at least one embodiment of the present disclosure.

FIG. 3 illustrates examples of spectrum reclaiming in accordance with at least one embodiment of the present disclosure. As disclosed in regard to FIG. 1, leased spectrum may be reclaimed based on, for example, provisions set forth in an agreement between spectrum owner 102 and operator 104, a dual risk evaluation, etc. The examples illustrated in FIG. 3 show possible reclaiming operations based on the occurrence of trigger 112. For example, in reclaiming operations 300 spectrum owner 102 is allowed to reclaim the full leased spectrum following the occurrence of trigger 112. Reclaiming operations 300 may be defined within the agreement established when the spectrum was first leased to operator 104. While these operations may be defined by agreement, the immediate handover of leased spectrum may negatively impact the QoS of users 106A . . . n. To avoid this situation, reclaiming operations 302 present an alternative procedure wherein, following the occurrence of trigger 112, delay 308 allows operator 104 some time to transition users 106A . . . n out of the leased spectrum in an orderly manner prior to spectrum owner 102 being allowed to reclaim the leased spectrum.

Reclaiming operations 304 disclose an example time domain reclaiming procedure. Spectrum owner 102 may be permitted full use of the leased spectrum over an increasing duration in each of time periods 310 to 316 until the leased spectrum is fully reclaimed by spectrum owner 102. For example, spectrum owner 102 is permitted to use the full leased spectrum for about a 33% of the duration time period 310. This percentage in increased to about 50% of the duration of time period 312 and 75% of the duration of time period 314 until the spectrum is full reclaimed in time period 316. The gradual rate of reclaiming that may be provided by reclaiming operations 304 may allow operator 104 to relocate users 106A . . . n out of the leased spectrum in a manner that will minimize the effect on QoS. In a similar manner, reclaiming operations 306 may operate gradually but in frequency domain. For example, following the occurrence of trigger 112 spectrum owner 102 may be allowed to reclaim certain frequencies or channels within the leased spectrum until the leased spectrum is fully reclaimed. Reclaiming operations 306 may allow operator 104 to gradually transfer users 106A . . . n to other channels within the leased spectrum while gradually moving other users 106A . . . n out of the leased spectrum, which may smooth out the transition out of the leased spectrum to alternative bandwidth, and thus, may reduce the negative impact to QoS.

Figure 4:
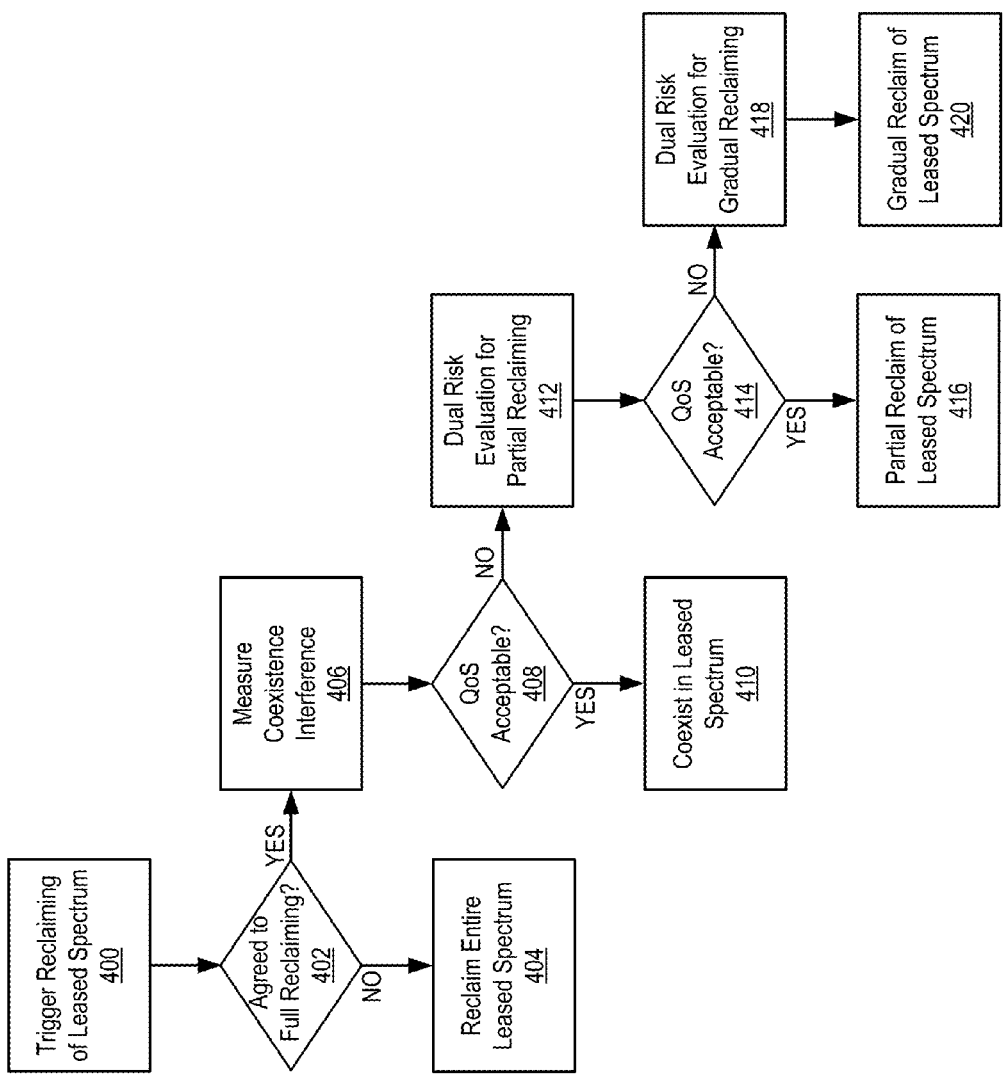
FIG. 4 illustrates example operations for spectrum reclaiming in accordance with at least one embodiment of the present disclosure.

FIG. 4 illustrates example operations for spectrum reclaiming in accordance with at least one embodiment of the present disclosure. In operation 400 trigger 112 may be detected. For example, at least SEC 108 may receive a message from spectrum owner 102 requesting to reclaim leased spectrum. A determination may be made in operation 402 as to whether full reclaiming was agreed to when the spectrum was leased. If it is determined in operation 402 that full reclaiming was agreed to, then in operation 404 the entire leased spectrum may be reclaimed. If it is determined in operation 402 that there was no agreement, then in operation 406 interference may be measured during coexistence of spectrum owner 102 and operator 104 within the leased bandwidth. A determination may then be made in operation 408 as to whether coexistence would result in an acceptable QoS (e.g., the service provided would still be acceptable to users 106A . . . n). If it is determined in operation 408 that the resulting QoS would be acceptable for users 106A . . . n, then in operation 410 both spectrum owner 102 and operator 104 may be allowed to operate within the leased spectrum.

If in operation 408 it is determined that coexistence would not result in an acceptable QoS, then in operation 412 a dual risk evaluation may be performed to estimate the impact of allowing spectrum owner 102 to partially reclaim the leased spectrum. A determination may then be performed in operation 414 as to whether the QoS resulting from allowing a partial reclaiming of the leased spectrum by spectrum owner 102 would still allow for an acceptable QoS. If in operation 414 it is determined that the resulting QoS would be acceptable, then in operation 416 spectrum owner 102 may be allowed to partially reclaim the leased spectrum. In one embodiment, the amount of spectrum that spectrum owner 102 is allowed to reclaim may be based on the dual risk evaluation. If in operation 414 it is determined that partial reclaiming would result in an unacceptable QoS, then in operation 418 a dual risk evaluation may be performed based on a procedure that allows spectrum owner 102 to gradually reclaim the leased spectrum. The results of the dual risk evaluation in operation 418 may dictate how spectrum may be reclaimed by spectrum owner 102 in operation 42o (e.g., the rate at which the leased spectrum may be reclaimed by spectrum owner 102 to ensure an acceptable QoS).

Figure 5:
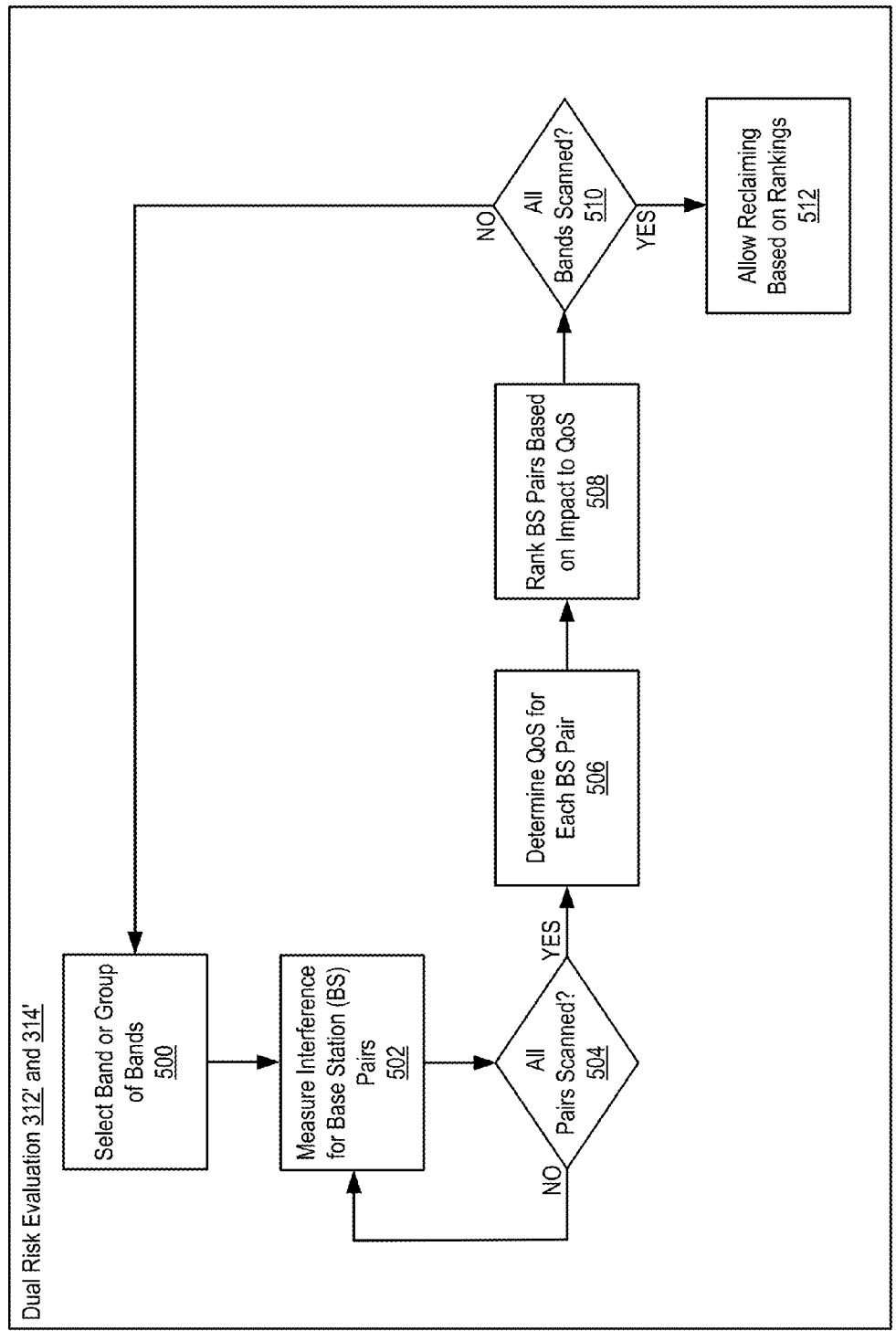
FIG. 5 illustrates example operations for dual risk evaluation in accordance with at least one embodiment of the present disclosure.

FIG. 5 illustrates example operations for dual risk evaluation in accordance with at least one embodiment of the present disclosure. In general, dual risk evaluation 312' and/or 314' may determine how quickly leased spectrum may be returned to spectrum owner 102 while minimizing the negative impact to QoS for users 106A . . . n. FIG. 5 discloses general operations for dual risk evaluation, which may in practice be based on different mathematical models as will be disclosed in regard to FIGS. 6 to 8. The operations disclosed in FIG. 5 may be performed by one or both of spectrum owner 102 and operator 104. In operation 500 a band or group of bands within the leased spectrum may be selected. An interference measure may then be determined for each BS pair at the selected band or groups of bands in operation 502. Example BS pairs may include a BS from the communication architecture of spectrum owner 102 along with a BS from the communication architecture of operator 104 operating within the same region or cell in a cellular communication system. Each BS in the pair, if operating concurrently, may cause interference for the corresponding BS in the other system. Interference for BS pairs may continue to be measured until it is determined in operation 504 that all BS pairs have been scanned in a particular geographic area of effectiveness. For example, the deactivation of one BS (e.g., at least with respect to the leased spectrum) may have a ripple effect on adjacent BSs within the same system (e.g., some wireless traffic may be moved from a deactivated BS to another) and thus, the area of effectiveness may need to be limited otherwise the dual risk evaluation may become too ponderous to effect a transition.

Following a determination in operation 504 that all BS pairs have been scanned for the particular band or group of bands, a QoS may then be determined for each BS pair. The QoS may characterize the impact of having the corresponding BS active on users 106A . . . n. The BS pairs may then be ranked based on the impact of coexistence to QoS in operation 508. For example, BS pairs that have high QoS may be more resilient to reclaiming while BS pairs having lower QoS may be much more susceptible to interference from a corresponding BS, and thus, much vulnerable to reclaiming. Operations 500 to 508 may continue until it is determined in operation 510 that the scanning of all bands, or groups of bands, is complete. In operation 512 the completed BS pair rankings may be utilized to generate a procedure for allowing spectrum owner 102 to reclaim the leased spectrum in a manner that will minimize the negative impact to QoS for at least users 106A . . . n.

FIG. 6 illustrates example interference criteria for dual risk evaluation in accordance with at least one embodiment of the present disclosure. An important operation in allowing spectrum owner 102 to reclaim the leased spectrum is dual risk evaluation. During dual risk evaluation key performance indicators (KPIs) may be identified to rank channel quality and mitigate the risk caused by spectrum reclaiming from different perspectives. Example KPIs may include, but are not limited to, candidate band usage level, interference levels, mobility range of the desired bands and propagation characteristics. Interference level KPI (iKPI) may be evaluated using methods such as heuristic ranking, pull-back optimization, (e.g., wherein "pull-back" comprises allowing bands or groups of bands to be reclaimed), predictive pull-back optimization, etc. In one embodiment, evaluating overall interference may involve a combination of results based on at least two of the above methods. An example relationship for iKPI that takes a combinatorial approach in managing spectrum reclaiming by pulling back the entire spectrum needed for spectrum owner 102 while maximizing overall QoS for users 106A . . . n may be represented as iKPI=select (Heuristic Result, LP pull-back, QP pull-back, or SQP pull-back), where all pull-back requests are satisfied and the QoS of customers is maximized. This resulting iKPI can be used as an input to more extensive KPI methods.

At least one objective consistent with the present disclosure may be to allow spectrum owner 102 to reclaim spectrum in consideration of iKPI so as to minimize the impact on QoS to operator 104. For example, risks in reclaiming the leased spectrum may be evaluated prior to spectrum owner 102 making a request to reclaim the leased spectrum. The evaluation may include, for example, a ranking of the of spectrum channels to determine an order for reclaiming that will minimize interference. For a given geography and agreement there may be a family of BSs and bands to be managed with respect to reclaim management. Each base station and set of bands may be characterized by a Signal to Interference Noise Ratio (SINR) relationship as follows:

$$SINR = \left(\frac{P}{I+N}\right) \quad (1)$$

Wherein $P=\Psi_s/PL_{s,r}$ represents the received power at the receiver (r) due to the signal of the sender (s), $I=\Sigma_{i\ne s}\Psi_i/PL_{i,r}$ represents the interference power of other simultaneous transmissions, N=Background noise power, which is typically fixed, $\Psi_s$=Transmit power of the sender (s) in a uniform power network that is assumed to be the same for all stations, $PL_{s,r}$=Path loss between the sender (s) and receiver (r) taking into account the Euclidean distance between them.

The combinatorial assessment of the spectrum owner-to-operator pairing across the base station population involved in an agreement may be more efficiently managed (with respect to risk) by dynamically ranking the reclaiming characteristics that may minimize the negative effects on both parties (e.g., may provide spectrum operator 104 with spectrum to meet its immediate communication need while minimizing the negative impact on QoS for operator 104). For a given spectrum owner 102, a series of overlapping station signals must work with the installed BS infrastructure of operator 104 on a band-by-band basis. This is illustrated in FIG. 6 wherein over various regions 600 (e.g., cells) BS pairs may exist, with a BS from the communication infrastructure of spectrum owner 102 (e.g., BS1o, BS2o, BS3o, etc.) being collocated with a BS from the communication infrastructure of operator 104 (e.g., BS1r, BS2r, BS3r, etc.). By using SINR as a controlling measurement, a multi-input and multi-output (MIMO) model may be formulated to characterize the health of the local network relationships. Where overlapping BS signals are compatible, risk may be spread amongst both parties (e.g., spectrum owner 102 and operator 104) by allowing switching between compatible BSs in-band, which may preserve the QoS and allowing more graceful degradation during spectrum reclaiming. Example SINR table 602 describes these relationships for a specific band (or group of bands). It should be noted that SINR may be computed between sender (e.g., operator 104) and receiver (e.g., users 106A . . . n). Thus, SINR (dB) in table 602 refers to the aggregated representation of SINR (dB) (e.g., total, average, delta from max, or other statistics) across all send and receive activities for a specific BS. If SINR is available on a per BS basis then this signal would be used instead.

As BS-specific bands need to be off-loaded or reclaimed, they can be reclaimed in an order that minimizes impact to operator 104 while meeting the needs of spectrum owner 102. By identifying where loads can be shifted to maximize QoS during reclamation, the best service path can be preserved over time. In cases where the BS population is sparse, the reclaiming operations may involve a more direct pull-back of leased spectrum. In cases where the BS population is rich, the reclamation of leased spectrum may be managed in a more robust manner for all parties involved.

While many types of algorithms may be utilized, three examples consistent with the present disclosure are disclosed below. A simple heuristic (e.g., experienced based solution) may involve operations for computing interference and ranking the results. For example, at the desired frequency, SINR may be computed for each BS pairing described in table 602. An available power (AP) to Total Power (TP) ratio that remains may then be computed for each operator 104 BS. A QoS Score=SINR*(AP/TP) may then be computed for each pair in table 602. This may provide an available power ranking weighted against signal quality for each matrix relationship. The higher the available power, the higher the ranking. Weak signal quality will penalize the QoS Score based on available power. Each pairing may then be ranked 1 . . . n based on the QoS Score strength, defining the pullback priority for a given geography, band and/or spectrum range. The implication in this example pull-back algorithm is that the higher the score the better the quality and available station load, and thus, the lower the risk of pull-back related drops relative to the available power limits of the impacted BS. The leased spectrum may then be reclaimed in the order computed for a given frequency, interval in time and pull-back demand quantity as a post ranking processing event as measured against the available power per base station.

Pull-back may also be executed evenly or weighted in a defined way by spectrum owner 102 to achieve pull-back objectives. With the risk for non-linearity as the algorithm progresses from interval-to-interval, in one embodiment the filtering of raw results may be found to be desirable. Pre- and post-filtering algorithms may be employed to manage a range of system non-linearities, to propagate desired behavior or to block undesired behavior under different operational scenarios, etc. Example filtering techniques may include, but are not limited to, low pass filters techniques that allow the passage of low frequencies while blocking higher frequency propagation, high pass filter techniques that pass high frequencies but block lower frequency propagation, Band-pass filters techniques that allow passage of a defined range of frequencies, Band-stop filters that allow the propagation of frequencies outside of a defined frequency band to pass, notch-filters can be used to provide a null response at set frequencies as needed, all-pass filtering techniques that pass all frequencies but may modify the phase relationship between frequencies, equalization filters that may gradually vary the amplitude of response as a function of frequency, etc. These techniques may be utilized individually or in-combination to achieve the desired system response characteristics.

A second option based on the simple heuristic ranking algorithm is to utilize ΔSINR instead of SINR, wherein:

$$\Delta SINR = \left(\frac{TP - P}{I + N}\right) \quad (2)$$

Wherein TP represents the total power of the BS, $P=\Psi_s/PL_{s,r}$ represents the received power at the receiver (r) due to the signal of the sender (s), $I=\Sigma_{i\neq s} \Psi i/PL_i,r$ represents the interference power of other simultaneous transmissions, N=Background noise power, which is typically fixed, $\Psi_s$=Transmit power of the sender (s) in a uniform power network that is assumed to be the same for all stations, $PL_{s,r}$=Path loss between the sender (s) and receiver (r) taking into account the Euclidean distance between them.

In an example algorithm for determining a pull-back order, ΔSINR may be computed for each BS pair as illustrated in table 604. This provides an AP ranking weighted against signal quality for each BS pair in table 604, wherein AP=TP−P. Given all other factors are equal, the higher the available power the higher the ranking. Similar to the above algorithm, weak signal quality will penalize AP. Each BS pairing may then be ranked 1 . . . n based on ΔSINR strength, defining pull-back priority for a given geography, band and/or spectrum range. In this example scenario the implication is that the higher the score the better the quality and available station load, which lowers the risk of pull-back related drops relative to the available power limits of the impacted base station. The leased spectrum may then be reclaimed in the order computed for a given frequency, interval in time and pull back demand quantity as a post ranking processing event measured against the available power per BS. Pull-back may also be executed evenly or weighted in a defined way by spectrum owner 102 to achieve pull-back objectives.

In one embodiment, pull-back optimization may further be based on demand signal integration using linear programming methods. For example, a heuristic method based on ΔSINR may be employed to populate table 604 wherein, IF Δ SINR>a defined threshold, set K=1.0. The threshold may then be set in a conservative manner such that the non-zero gains have a sufficient QoS. Dynamics for a multi-mode Device (MMD) to connect to a BS including a connection delay is 1-3 seconds for most bands may be defined as follows:

$$G(s) = \frac{K * e^{-t_d * s}}{(tau * s + 1)}, \text{ where } K = 1, t_d = 3, tau = 5 \quad (3)$$

Wherein it is assumed fast first-order dynamics and/or other model forms may apply. The TP allowed for each BS of operator 104 may then be loaded into the above relationship and used to set as the high limit constraints for the BS of operator 104 variables. The TP allowed for each BS of spectrum owner 102 may then be loaded and used to set as the high limit constraints for the BS of spectrum owner 102 variables. Table 606 in FIG. 6 discloses an example of this calculation and includes two pull-back signals disclosed as PB1 (PB1o and PB1d) and PB2 (PB2o and PB2d) respectively. In table 606 $K_{s\#o\#r}$ may represent an operator—owner BS pairing and Pull-Back gain is $K_{s\#opb\#}$ and $K_{pb\#dpb\#}$. The pull-back demand signal request for the current interval (PB1d and PB2d) may then be loaded into relationship (3). Where BS pairings exist for a pull-back request (i.e. K>0), a feasible power loading pull-back vector profile change may be computed across all operator 104 BSs (BS1r . . . BS3r) that maximizes QoS by minimizing the change in base station loading (subject to MV and CV constraints) required to fully satisfy all pull-back request quantities. For example, based on table 606:

$$\min_{u} J(u) \quad (4)$$
$$s.t.$$

$$J(u)=\Sigma_{k=0}^{N_p-1} W_e(k)|\hat{y}(t+k+1)-r(t+k+1)|+W_{\Delta u}(k)|\Delta u(t+k)| \quad (5)$$

$$x(k+1)=Ax(k)+Bu(k) \quad (6)$$

$$u(k)=u_m(k)+u_d(k) \quad (7)$$

$$y(k)=Cx(k)+Du(k) \quad (8)$$

Wherein, $$u_{m_{min}} \leq u(t+k) \leq u_{m_{max}}$$

$$\Delta u_{m_{min}} \leq \Delta u(t+k) \leq \Delta u_{m_{max}}$$

$$y_{min} \leq \hat{y}(t+k+1) \leq y_{max}$$

In this example, J(u)=the function to be minimized (e.g., this can be posed as a maximization as well by changing the sign of the weighting coefficient, W, ŷ=the predicted load of spectrum owner 102 BSs in decibels (dB), r=the desired loading target for the BSs (e.g., for this IDF PB1o and PB2o targets must be set to zero with large Q weighting), u=the independent variables (manipulated+disturbance) for the operator 104 BS, x=the state variable that described the linear time-invariant system, $N_p$=the length of the prediction horizon, t=current time interval, $y_{1 \ldots 3}$=the controlled variable for spectrum owner 102 BSs (e.g., BS1o, BS2o, and BS3o) in dB units, $y_{min}$ and $y_{max}$=the controlled variable low limit and high limit in dB units for variables $y_{1 \ldots 3}$ (e.g., this would be a low and high power limit for spectrum owner 102 BSs), $u_{m1 \ldots m3}$=the manipulated variable for operator 104 BSs (e.g., BS1r, BS2r, and BS3r) in dB units, $\Delta u_{m1 \ldots m3}$=the manipulated variable for the deviation delta from $\Delta u_{m_{min}}$ and $\Delta u_{m_{max}}$ and $u_{m_{min}}$ and $u_{m_{max}}$=the manipulated variable defined low limit and high limit in dB for $U_{m1 \ldots m3}$ respectively (e.g., this would be where the maximum allowed power for operator 104 BSs would be set along with any minimum).

It may also be possible to design MIMO model for pull-back optimization based on demand signal forecast using quadratic programming methods utilizing the same design and variable initialization methods as presented above. While there are many examples possible, in the Standard Form the model predictive control action at time k is obtained by solving the optimization problem:

$$\Delta u(k|k), \ldots, \min_{\Delta u}(m-1+k|k), \quad (12)$$

$$\varepsilon\left\{\Sigma_{i=0}^{p-1}\left(\Sigma_{j=1}^{n_y}|w_i + \frac{y}{1}, j(y_j(k+i+1|k) - r_j(k+i+1)|^2 + \Sigma_{j=1}^{n_y} w_{i,j}^{\Delta u}\Delta uj(k+i|k)|^2 + \Sigma_{j=1}^{n_y}|w_{i,j}^{\Delta u}\right\}\right.$$

Wherein subscript "( )$_j$" is the j component of a vector, (k+i|k) is the value predicted for time k+I and r(k) is the current sample of the output reference horizon, subject to:

$$u_{jmin}(i) - \epsilon V_{jmin}^u(i) \leq u_j(k+i|k) \leq u_{jmax}(i) + \epsilon V_{jmax}^u(i) \quad (13)$$

$$\Delta u_{jmin}(i) - \epsilon V_{jmin}^{\Delta u}(i) \leq \Delta u_j(k+i|k) \leq \Delta u_{jmax}(i) + \epsilon V_{jmax}^{\Delta u}(i) \quad (14)$$

$$y_{jmin}(i) - \epsilon V_{jmin}^y(i) \leq y_j(k+1+1|k) \leq y_{jmax} + \epsilon V_{jmax}^{\Delta u}(i) \quad (15)$$

$$\Delta u(k+h|k) = 0 \quad (16)$$

$$\epsilon \geq 0 \quad (17)$$

Wherein i=0, . . . , p 1 and h=m, . . . , p 1 with respect to the sequence of input increments {Δu(k|), . . . , Δu(m 1+k|k)} and to the slack variable ϵ. The control action sent to the plant may then be u(k)=u(k 1)+Δu(k|k)*, where Δu(k|k)* is the first element of the optimal sequence. For iKPI=select (Heuristic Result, LP pull-back, QP pull-back, or SQP pull-back), wherein all pull-back requests are satisfied and QoS of customers is maximized.

A comparison of the BS1r . . . BS3r pullback quantities may be performed relative to PB1o and PB2o pull-back satisfaction for any specific pull-back interval request. Weighting of any pull back method may be controlled by specific weights applied to the ranking for the reclaiming operation. For linear programming (LP) or quadratic programming (QP) methods, weighting may be applied using the high and low limits of the PB1o and PB2o pull-back inventories. While the pull-back inventory targets may be set to zero in the most extreme cases, non-zero values can be set as required to balance pull-back with QoS as agreed to by the parties involved. For all methods, the pull-back assumption may be that the volume of pull-back needed can be reclaimed from the feasible pairings available.

Figure 7:
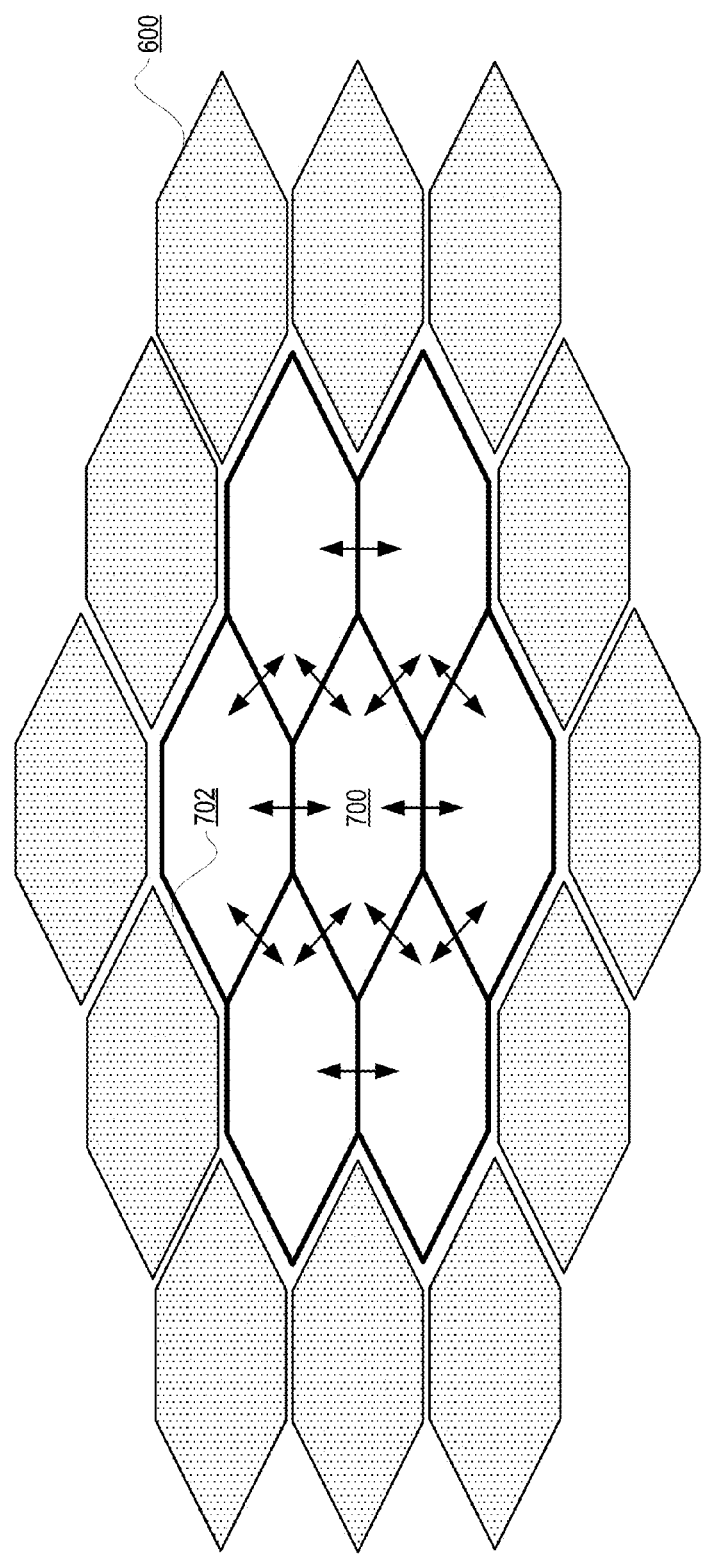
FIG. 7 illustrates an example of the effects of spectrum reclaiming on adjacent cells in a single layer cellular system accordance with at least one embodiment of the present disclosure.

FIG. 7 illustrates an example of the effects of spectrum reclaiming on adjacent cells in a single layer cellular system accordance with at least one embodiment of the present disclosure. A network of cells 600 is shown that may comprise certain cells 700 targeted for reclaiming surrounded by border zone 702. An important aspect of spectrum reclaiming is that in some situations a change in spectrum allocation in a portion of a cellular network may propagate throughout the entire network. A change of spectrum allocation in a cells 600 may imply changes in its neighboring cells 600 (e.g., due to an altered interference situation), and likewise, may result in changes that may continue to propagate through adjacent cells 600. In view of this situation, it becomes important that spectrum reclaiming is contained within a limited geographic area such that the spectrum reclaiming only impacts a limited set of BS configurations, and thus, a reconfiguration of the entire network may be avoided.

Limiting spectrum reallocation to a "contained" cell area may avoid the propagation of changes throughout the network. When approaching reclaiming, the size of the contained cell area 700 should be evaluated for both spectrum owner 102 and operator 104. A spectrum reclaiming approach may be selected that leads to the smallest "contained" cell area 700. Where this choice is unsuitable due to a negative impact on other KPIs, another solution may need to be selected for which the size of the contained cell area 700 should be as small as possible while satisfying other relevant KPIs. In case that any entities operating within the spectrum do not use/deploy a cellular communication system, other coverage models may be used (e.g., allotments for TV broadcasting, etc.).

When allocating leased spectrum to operator 104, it may be beneficial to ensure that the spectrum-reallocation cell area 700 is contained in case that spectrum owner 102 reclaims the leased spectrum. This may in particular be achieved by separating such contained area from neighboring areas by using different frequency allocations in between as border zones 702. Those different frequency allocations are preferably licensed bands, but also unlicensed spectrum or leased spectrum may be used, preferably leased from different spectrum owner stakeholders such that a re-allocation within contained area 700 does not automatically imply reallocation of border zone 702.

FIG. 8 illustrates an example of the effects of spectrum reclaiming on adjacent cells in a multilayer cellular system in accordance with at least one embodiment of the present disclosure. A second layer of cells 800 is illustrated in FIG. 8 including contained cells 802 and border zones 804. Second layer of cells 800 may pertain to, for example, other operators with BSs in the same geographic area as spectrum owner 102 and operator 104. Depending on the spectrum reclaiming needs of spectrum owner 102, contained cell area 800 may change as well as the area of the cells outside of the contained area with border zone 804 changing at the same time. In accordance with any of the reclamation methods described above, cell partitioning may be controlled by definition of the scope of a given algorithm with design flexibility achieved by supporting a distributed control architecture implementation. For example, feasible BS pairings may be based on signal quality with specific signal quality limits set to define the allowed partition scope for any reclamation activity. This prevents the adjacent weaker BS signal from being included in the reclamation task. Partitioning can also be controlled by designing control algorithms on a per-band ID basis. If required, dynamic construction of a matrix for any given reclamation activity can be limited to a small physical number of BSs for the networks of spectrum owner 102 and operator 104 to provide hard limits geographically. Many different instances of a control algorithm may be running in the same geographical area subject to defined partitioning (e.g. by band id, frequency, physical number of base stations etc.). When the combined effect of multiple algorithms operating in a larger geography must be considered, a supervisory LP or heuristic may be defined to protect broader system constraints, as required.

While FIGS. 4 to 5 illustrates operations according to different embodiments, it is to be understood that not all of the operations depicted in FIGS. 4 to 5 are necessary for other embodiments. Indeed, it is fully contemplated herein that in other embodiments of the present disclosure, the operations depicted in FIGS. 4 to 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory machine readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to spectrum reclaiming in a leased spectrum system. A spectrum exchange coordinator (SEC) may be interposed between a spectrum owner and at least one operator to facilitate the leasing and reclaiming of spectrum. Upon occurrence of a trigger, the SEC may then determine a procedure for allowing the spectrum owner to reclaim the leased spectrum. The spectrum owner may be allowed to reclaim the leased spectrum in full based on an agreement. If not previously agreed to, the spectrum owner may be allowed to reclaim at least part of the spectrum. These operations may include a dual risk evaluation to determine how reclaiming the leased spectrum will affect quality of service (QoS). Partial or gradual reclaiming may then allow the leased spectrum to be reclaimed while minimizing impact. Examples of gradual reclaiming may be based on a time domain, frequency domain, or cellular basis.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for spectrum reclaiming in a leased spectrum system, as provided below.

According to example 1 there is provided a device for managing the reclaiming of leased spectrum. The device may comprise a communication module to communicate with at least one of a spectrum owner and at least one operator and a spectrum leasing and reclaiming module to determine operations for allowing the spectrum owner to reclaim at least part of a leased spectrum from the at least one operator and allow the spectrum owner to reclaim the at least part of the leased spectrum from the at least one operator based on the operations.

Example 2 may include the elements of example 1, wherein the operations comprise the spectrum leasing and reclaiming module being further to allow the spectrum owner to reclaim at least part of the leased spectrum upon request or after a delay after the request is received based on an agreement between the spectrum owner and the at least one operator.

Example 3 may include the elements of any of examples 1 to 2, wherein the operations comprise the spectrum leasing and reclaiming module being further to determine whether the spectrum owner and the at least one operator can operate concurrently within the leased spectrum based on a quality of service measurement obtained from at least one of the spectrum owner or the at least one operator.

Example 4 may include the elements of example 3, wherein the operations comprise the spectrum leasing and reclaiming module being further to, upon determining that the spectrum owner and the at least one operator cannot operate concurrently within the leased spectrum, cause the spectrum owner and the at least one operator to perform a dual risk evaluation.

Example 5 may include the elements of example 4, wherein the dual risk evaluation comprises the spectrum leasing and reclaiming module being further to cause at least one of the spectrum owner and the at least one operator to measure interference at corresponding base station pairs in a frequency band or a group of frequency bands, and to determine a signal-to-interference noise ratio for each base station pair based on the interference.

Example 6 may include the elements of example 5, wherein the operations comprise the spectrum leasing and reclaiming module being further to rank the impact on quality of service of allowing spectrum to be reclaimed for each base station pair, the impact on the quality of service being based at least on the signal-to-interference noise ratio.

Example 7 may include the elements of example 6, wherein the impact on the quality of service is based on a change in signal to noise ratio formulated utilizing a total power value for the operator base station in each base station pair.

Example 8 may include the elements of example 6, wherein the ranking is determined using at least one of a linear program or quadratic program to maximize the quality of service based on at least one of a current load for each base station pair or a projected load for each base station pair.

Example 9 may include the elements of example 8, wherein the ranking is determined based on demand signal integration using linear programming methods.

Example 10 may include the elements of example 8, wherein the ranking is determined using a multiple input/multiple output (MIMO) model for pullback optimization based on a demand signal forecast using quadratic programming methods.

Example 11 may include the elements of example 6, wherein the operations comprise the spectrum leasing and reclaiming module being further to allow the spectrum owner to reclaim the spectrum gradually based on the dual risk evaluation.

Example 12 may include the elements of example 11, wherein reclaiming the spectrum gradually comprises returning full use of the leased spectrum to the spectrum owner over increasing durations in a series of time periods or over increasing frequencies in the series of time periods.

Example 13 may include the elements of example 11, wherein reclaiming the spectrum gradually comprises returning full use of the leased spectrum to the spectrum owner on a regional basis based at least on the ranking.

Example 14 may include the elements of example 11, wherein reclaiming the spectrum gradually comprises at least one of returning full use of the leased spectrum to the spectrum owner over increasing durations in a series of time periods, over increasing frequencies in the series of time periods or on a regional basis based at least on the ranking.

According to example 15 there is provided a method for allowing leased spectrum to be reclaimed. The method may comprise determining if a spectrum owner and at least one operator leasing spectrum from the spectrum owner can operate concurrently within the leased spectrum, and if it is determined that the spectrum owner and at least one operator cannot operate concurrently within the leased spectrum, determining how to allow the spectrum owner to reclaim at least part of the leased spectrum while minimizing a negative impact on quality of service for the at least one operator.

Example 16 may include the elements of example 15, wherein determining if the spectrum owner and the at least one operator leasing spectrum from the spectrum owner can operate concurrently within the leased spectrum comprises measuring interference within the leased spectrum.

Example 17 may include the elements of any of examples 15 to 16, wherein determining how to allow the spectrum owner to reclaim at least part of the leased spectrum comprises performing at least one of a dual risk evaluation for partial reclaiming or a dual risk evaluation for gradual reclaiming.

Example 18 may include the elements of example 17, wherein the dual risk evaluation for partial reclaiming comprises causing the at least one of the spectrum owner and the at least one operator to measure interference at corresponding base station pairs, determining a signal-to-interference noise ratio for each base station pair based on the measured interference and ranking the negative impact on quality of service at each base station pair when the spectrum owner is allowed to reclaim at least part of the leased spectrum all at once based at least on the signal-to-interference noise ratio.

Example 19 may include the elements of example 18, wherein the dual risk evaluation for gradual reclaiming comprises causing the at least one of the spectrum owner and the at least one operator to measure interference at corresponding base station pairs, determining a signal-to-interference noise ratio for each base station pair based on the measured interference and ranking the negative impact on quality of service at each base station pair when the spectrum owner is allowed to reclaim at least part of the leased spectrum gradually over a series of time periods based at least on the signal-to-interference noise ratio.

Example 20 may include the elements of example 19, wherein the ranking is determined using at least one of a linear program or quadratic program to maximize the quality of service based on at least one of a current load for each base station pair or a projected load for each base station pair.

Example 21 may include the elements of example 20, wherein the ranking is determined based on demand signal integration using linear programming methods.

Example 22 may include the elements of example 20, wherein the ranking is determined using a multiple input/multiple output (MIMO) model for pullback optimization based on a demand signal forecast using quadratic programming methods.

Example 23 may include the elements of example 19, wherein allowing the spectrum owner to gradually reclaim at least part of the leased spectrum comprises returning full use of the at least part of the leased spectrum to the spectrum owner over increasing durations in the series of time periods or over increasing frequencies in the series of time periods.

Example 24 may include the elements of example 19, wherein allowing the spectrum owner to gradually reclaim at least part of the leased spectrum comprises returning full use of the at least part of the leased spectrum to the spectrum owner on a regional basis based at least on the ranking.

Example 25 may include the elements of example 24, wherein returning full use of the at least part of the leased spectrum to the spectrum owner on a regional basis comprises containing a region being returned to the spectrum owner to an area including a certain number of base station pairs to limit change propagation throughout the base stations of the at least one operator.

Example 26 may include the elements of example 25, wherein the region comprises more than one layer based on the number of operators with base stations in the region.

Example 27 may include the elements of example 25, wherein limiting the change propagation throughout the base stations of the at least one operator comprises creating a border zone surrounding the region, the base stations in the border zone utilizing different frequency allocations than the base stations in the region being return to the spectrum owner.

Example 28 may include the elements of example 19, wherein returning full use of the at least part of the leased spectrum to the spectrum owner on a regional basis comprises containing a region being returned to the spectrum owner to an area including a certain number of base station pairs to limit change propagation throughout the base stations of the at least one operator.

According to example 29 there is provided a system including a device, the system being arranged to perform the method of any of the above examples 15 to 28.

According to example 30 there is provided a chipset arranged to perform the method of any of the above examples 15 to 28.

According to example 31 there is provided at least one machine readable medium comprising a plurality of instructions that, in response to be being executed on a computing device, cause the computing device to carry out the method according to any of the above examples 15 to 28.

According to example 32 there is provided at least one device configured for managing spectrum reclaiming in a leased spectrum system, the device being arranged to perform the method of any of the above examples 15 to 28.

According to example 33 there is provided a system for allowing leased spectrum to be reclaimed. The system may comprise means for determining if a spectrum owner and at least one operator leasing spectrum from the spectrum owner can operate concurrently within the leased spectrum and means for, if it is determined that the spectrum owner and at least one operator cannot operate concurrently within the leased spectrum, determining how to allow the spectrum owner to reclaim at least part of the leased spectrum while minimizing a negative impact on quality of service for the at least one operator.

Example 34 may include the elements of example 33, wherein the means for determining if the spectrum owner and the at least one operator leasing spectrum from the spectrum owner can operate concurrently within the leased spectrum comprise means for measuring interference within the leased spectrum.

Example 35 may include the elements of any of examples 33 to 34, wherein the means for determining how to allow the spectrum owner to reclaim at least part of the leased spectrum comprise means for performing at least one of a dual risk evaluation for partial reclaiming or a dual risk evaluation for gradual reclaiming.

Example 36 may include the elements of example 35, wherein the dual risk evaluation for partial reclaiming comprises means for causing the at least one of the spectrum owner and the at least one operator to measure interference at corresponding base station pairs, means for determining a signal-to-interference noise ratio for each base station pair based on the measured interference and means for ranking the negative impact on quality of service at each base station pair when the spectrum owner is allowed to reclaim at least part of the leased spectrum all at once based at least on the signal-to-interference noise ratio.

Example 37 may include the elements of example 36, wherein the dual risk evaluation for gradual reclaiming comprises means for causing the at least one of the spectrum owner and the at least one operator to measure interference at corresponding base station pairs, means for determining a signal-to-interference noise ratio for each base station pair based on the measured interference and means for ranking the negative impact on quality of service at each base station pair when the spectrum owner is allowed to reclaim at least part of the leased spectrum gradually over a series of time periods based at least on the signal-to-interference noise ratio.

Example 38 may include the elements of example 37, wherein the ranking is determined using at least one of a linear program or quadratic program to maximize the quality of service based on at least one of a current load for each base station pair or a projected load for each base station pair.

Example 39 may include the elements of example 37, wherein the means for allowing the spectrum owner to gradually reclaim at least part of the leased spectrum comprise means for at least one of returning full use of the at least part of the leased spectrum to the spectrum owner over increasing durations in the series of time periods, over increasing frequencies in the series of time periods on a regional basis based at least on the ranking.

Example 40 may include the elements of example 39, wherein the means for returning full use of the at least part of the leased spectrum to the spectrum owner on a regional basis comprise means for containing a region being returned to the spectrum owner to an area including a certain number of base station pairs to limit change propagation throughout the base stations of the at least one operator.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. At least one device for managing the reclaiming of leased spectrum, comprising:
    a communication module to communicate with at least one of a spectrum owner and at least one operator; and
    a spectrum leasing and reclaiming module to:
        determine operations for allowing the spectrum owner to reclaim at least part of a leased spectrum from the at least one operator; and
        allow the spectrum owner to reclaim the at least part of the leased spectrum from the at least one operator based on the operations;
    wherein the operations comprise the spectrum leasing and reclaiming module being further to determine whether the spectrum owner and the at least one operator can operate concurrently within the leased spectrum based on a quality of service measurement obtained from at least one of the spectrum owner or the at least one operator.

2. The at least one device of claim 1, wherein the operations comprise the spectrum leasing and reclaiming module being further to allow the spectrum owner to reclaim at least part of the leased spectrum upon request or after a delay after the request is received based on an agreement between the spectrum owner and the at least one operator.

3. The at least one device of claim 1, wherein the operations comprise the spectrum leasing and reclaiming module being further to, upon determining that the spectrum owner and the at least one operator cannot operate concurrently within the leased spectrum, cause the spectrum owner and the at least one operator to perform a dual risk evaluation.

4. The at least one device of claim 3, wherein the dual risk evaluation comprises the spectrum leasing and reclaiming module being further to cause at least one of the spectrum owner and the at least one operator to measure interference at corresponding base station pairs in a frequency band or a group of frequency bands, and to determine a signal-to-interference noise ratio for each base station pair based on the interference.

5. The at least one device of claim 4, wherein the operations comprise the spectrum leasing and reclaiming module being further to rank the impact on quality of service of allowing spectrum to be reclaimed for each base station pair, the impact on the quality of service being based at least on the signal-to-interference noise ratio.

6. The at least one device of claim 5, wherein the ranking is determined using at least one of a linear program or quadratic program to maximize the quality of service based on at least one of a current load for each base station pair or a projected load for each base station pair.

7. The at least one device of claim 5, wherein the operations comprise the spectrum leasing and reclaiming module being further to allow the spectrum owner to reclaim the spectrum gradually based on the dual risk evaluation.

8. The at least one device of claim 7, wherein reclaiming the spectrum gradually comprises at least one of returning full use of the leased spectrum to the spectrum owner over increasing durations in a series of time periods, over increasing frequencies in the series of time periods or on a regional basis based at least on the ranking.

9. A method for allowing leased spectrum to be reclaimed, comprising:
    determining if a spectrum owner and at least one operator leasing spectrum from the spectrum owner can operate concurrently within the leased spectrum; and
    if it is determined that the spectrum owner and at least one operator cannot operate concurrently within the leased spectrum, determining how to allow the spectrum owner to reclaim at least part of the leased spectrum while minimizing a negative impact on quality of service for the at least one operator.

10. The method of claim 9, wherein determining if the spectrum owner and the at least one operator leasing spectrum from the spectrum owner can operate concurrently within the leased spectrum comprises measuring interference within the leased spectrum.

11. The method of claim 9, wherein determining how to allow the spectrum owner to reclaim at least part of the leased spectrum comprises performing at least one of a dual risk evaluation for partial reclaiming or a dual risk evaluation for gradual reclaiming.

12. The method of claim 11, wherein the dual risk evaluation for partial reclaiming comprises:
    causing the at least one of the spectrum owner and the at least one operator to measure interference at corresponding base station pairs;
    determining a signal-to-interference noise ratio for each base station pair based on the measured interference; and
    ranking the negative impact on quality of service at each base station pair when the spectrum owner is allowed to reclaim at least part of the leased spectrum all at once based at least on the signal-to-interference noise ratio.

13. The method of claim 12, wherein the dual risk evaluation for gradual reclaiming comprises:
    causing the at least one of the spectrum owner and the at least one operator to measure interference at corresponding base station pairs;
    determining a signal-to-interference noise ratio for each base station pair based on the measured interference; and
    ranking the negative impact on quality of service at each base station pair when the spectrum owner is allowed to reclaim at least part of the leased spectrum gradually over a series of time periods based at least on the signal-to-interference noise ratio.

14. The method of claim 13, wherein the ranking is determined using at least one of a linear program or quadratic program to maximize the quality of service based on at least one of a current load for each base station pair or a projected load for each base station pair.

15. The method of claim 13, wherein allowing the spectrum owner to gradually reclaim at least part of the leased spectrum comprises at least one of returning full use of the at least part of the leased spectrum to the spectrum owner over increasing durations in the series of time periods, over increasing frequencies in the series of time periods on a regional basis based at least on the ranking.

16. The method of claim 13, wherein returning full use of the at least part of the leased spectrum to the spectrum owner on a regional basis comprises containing a region being returned to the spectrum owner to an area including a certain number of base station pairs to limit change propagation throughout the base stations of the at least one operator.

17. At least one non-transitory machine readable storage medium having stored thereon, individually or in combination, instructions that when executed by one or more processors result in the following operations for allowing leased spectrum to be reclaimed, comprising:
    determining if a spectrum owner and at least one operator leasing spectrum from the spectrum owner can operate concurrently within the leased spectrum; and
    if it is determined that the spectrum owner and at least one operator cannot operate concurrently within the leased spectrum, determining how to allow the spectrum owner to reclaim at least part of the leased spectrum while minimizing a negative impact on quality of service for the at least one operator.

18. The non-transitory medium of claim 17, wherein determining if the spectrum owner and the at least one operator leasing spectrum from the spectrum owner can operate concurrently within the leased spectrum comprises measuring interference within the leased spectrum.

19. The non-transitory medium of claim 17, wherein determining how to allow the spectrum owner to reclaim at least part of the leased spectrum comprises performing at least one of a dual risk evaluation for partial reclaiming or a dual risk evaluation for gradual reclaiming.

20. The non-transitory medium of claim 19, wherein the dual risk evaluation for partial reclaiming comprises:
    causing the at least one of the spectrum owner and the at least one operator to measure interference at corresponding base station pairs;
    determining a signal-to-interference noise ratio for each base station pair based on the measured interference; and
    ranking the negative impact on quality of service at each base station pair when the spectrum owner is allowed to reclaim at least part of the leased spectrum all at once based at least on the signal-to-interference noise ratio.

21. The non-transitory medium of claim 20, wherein the dual risk evaluation for gradual reclaiming comprises:
    causing the at least one of the spectrum owner and the at least one operator to measure interference at corresponding base station pairs;
    determining a signal-to-interference noise ratio for each base station pair based on the measured interference; and
    ranking the negative impact on quality of service at each base station pair when the spectrum owner is allowed to reclaim at least part of the leased spectrum gradually over a series of time periods based at least on the signal-to-interference noise ratio.

22. The non-transitory medium of claim 21, wherein the ranking is determined using at least one of a linear program or quadratic program to maximize the quality of service based on at least one of a current load for each base station pair or a projected load for each base station pair.

23. The non-transitory medium of claim 21, wherein allowing the spectrum owner to gradually reclaim at least part of the leased spectrum comprises at least one of returning full use of the at least part of the leased spectrum to the spectrum owner over increasing durations in the series of time periods, over increasing frequencies in the series of time periods on a regional basis based at least on the ranking.

24. The non-transitory medium of claim 23, wherein returning full use of the at least part of the leased spectrum to the spectrum owner on a regional basis comprises containing a region being returned to the spectrum owner to an area including a certain number of base station pairs to limit change propagation throughout the base stations of the at least one operator.

* * * * *